J. WADDINGTON.
Grain-Binders.

No. 142,304. Patented August 26, 1873.

UNITED STATES PATENT OFFICE.

JAMES WADDINGTON, OF NEW PHILADELPHIA, OHIO.

IMPROVEMENT IN GRAIN-BINDERS.

Specification forming part of Letters Patent No. 142,304, dated August 26, 1873; application filed April 29, 1873.

*To all whom it may concern:*

Be it known that I, JAMES WADDINGTON, of New Philadelphia, in the county of Tuscarawas and State of Ohio, have invented certain new and useful Improvements in Device for Clamping Sheaves of Grain; and I do hereby declare that the following is a full, clear, and exact description thereof, reference being had to the accompanying drawings and to the letters of reference marked thereon which form a part of this specification.

The nature of my invention consists in the construction and arrangement of a device for clamping sheaves of grain preparatory to binding, as will be hereinafter more fully set forth.

In order to enable others skilled in the art to which my invention appertains to make and use the same, I will now proceed to describe its construction and operation, referring to the annexed drawing, in which—

Figure 1:
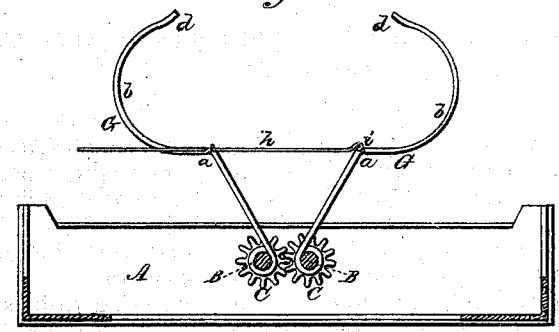
Figure 2:
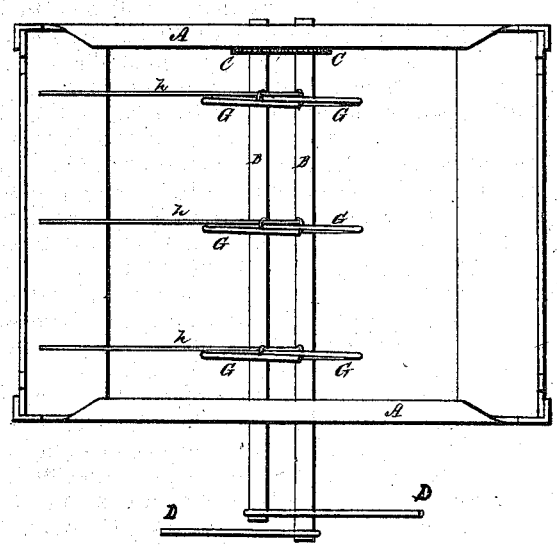

Figure 1 is a transverse vertical section, and Fig. 2 a plan view, of my device.

A represents a rectangular frame of suitable dimensions, in which are two parallel shafts, B B, with pinions C C gearing into each other. These pinions are located immediately inside on one side of the frame, while the shafts project through the other side of the frame for a suitable distance, and are, at the projecting ends, provided with levers D D. On each shaft B are two or more teeth, G G, made of wire, each tooth having a straight part from the shaft B to the point $a$, and from this point is a semicircular part, $b$, the extreme point $d$ of which is bent outward, as shown in Fig. 1. At the point $a$, on each of one set or series of teeth, is hooked a wire, $h$, which passes through an eye or loop, $i$, at the corresponding point upon each of the other set or series of teeth.

This clamp can either be bolted on the main platform of a harvester, or hinged to it.

There will be a stiff arm bolted on the frame A, and extending to the axle-tree, working on a hinge; and, at the hind part of the frame, there will be a wheel to carry the weight of the platform, the binder, and the boy that works the clamp.

For a rake that throws the sheaf from the platform broadsided the clamp will be attached with the points of the teeth to the platform; and, for a rake that brings the grain off heads foremost, it will be attached with the sides of the teeth to the platform.

The grain is thrown onto this clamp by a hand-rake, or a self-rake, or a dropper, and worked by a boy at the levers D D. The boy first pulls one of said levers, bringing the teeth G G toward each other, and, when it comes to making the heavy pressure on the sheaf, he tramps on the other lever as a treadle. The binder stands at the broad side of the sheaf, and, as soon as it is clamped, throws the band, which is of straw, around it, and ties it.

Having thus fully described my invention, what I claim as new, and desire to secure by Letters Patent, is—

1. The teeth G G, constructed as described, in combination with the wires $h\ h$, arranged, in relation to the teeth G, substantially as and for the purpose specified.

2. The combination of the frame A, shafts B B, pinions C C, levers D D, teeth G G, and wires $h\ h$, all substantially as and for the purposes herein set forth.

In testimony that I claim the foregoing as my own I affix my signature in presence of two witnesses.

JAMES WADDINGTON.

Witnesses:
   A. L. NEELY,
   PHILIP STRICKMAKER.